March 21, 1939.  C. L. RUSSELL  2,151,444
DOUGH DIVIDER
Filed Aug. 31, 1936  4 Sheets-Sheet 1

Charles L. Russell,
Inventor,
Delor F. Haynes,
Attorney.

March 21, 1939.   C. L. RUSSELL   2,151,444
DOUGH DIVIDER
Filed Aug. 31, 1936   4 Sheets-Sheet 4

Charles L. Russell,
Inventor,
Delos F. Haynes,
Attorney.

Patented Mar. 21, 1939

2,151,444

UNITED STATES PATENT OFFICE 2,151,444

DOUGH DIVIDER

Charles L. Russell, Clayton, Mo., assignor to American Bakers Machinery Company, St. Louis, Mo., a corporation of Missouri Application August 31, 1936, Serial No. 98,667

2 Claims. (Cl. 107—15)

This invention relates to bakers' machinery, and with regard to certain more specific features, to dough dividers.

Among the several objects of the invention may be noted the provision of a simple and rugged dough divider which is adapted to operate continuously; the provision of a dough divider having partitioning chambers in which substantially no "punishing" of the dough takes place; the provision of apparatus of this class described which has improved, adjustable scaling means; and the provision of a machine of this class which shall have regulable output. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which is illustrated one of various possible embodiments of the invention, Fig. 1 is a front elevation of a machine embodying the invention;

Fig. 6 is a vertical cross section taken substantially along line 6—6 of Fig. 5;

Fig. 7 is a fragmentary front elevation of a portion of Fig. 1, showing certain parts in an alternative position;

Fig. 8 is a diagrammatic view illustrating the progressive stages of operation of the scaling mechanism;

Fig. 9 is a diagrammatic developed view showing the layout of a cam in the scaling mechanism; and, Fig. 10 is a view similar to Fig. 9, showing a different adjustment of the cam.

Similar reference characters indicate corresponding parts throughout the several views of the drawings.

Heretofore machines of this class have been operated upon what is known as the batch principle, that is, the machine is loaded with a charge and then permitted to operate until the charge is substantially or completely depleted. It is then shut down and reloaded. The disadvantage of this system is that the machine is unproductive a substantial portion of the time. The present invention eliminates the batch operation and effects a continuous operation of the machine.

Prior machines have also used dividing and scaling means which, when registering with the supply tank or the like, have, at least at some adjustment, employed chambers of finite volume from which air was required to be expelled as the dough entered. This was disadvantageous, because added mechanism was required to vent the air, and furthermore, the dough needed to act as a compression member to drive out the air. These machines also made full use of the dough as a compression member to displace certain elements during the cycle operation which resulted in undesirable "punishing" of the dough. The present invention eliminates these difficulties.

A point to be noted in connection with the description set out hereinafter is that the present machine is well adapted to handle dough, as distinguished from batter. A batter is of a more fluid-like consistency; whereas dough is more or less plastic and thus more difficult to handle. Furthermore, dough should not be subjected to said so-called "punishing", that is, it should not be compressed and deformed to any great extent in the dividing and scaling or other operation. This problem does not enter into the art of handling batters as it does in the art of handling dough.

Figure 1:
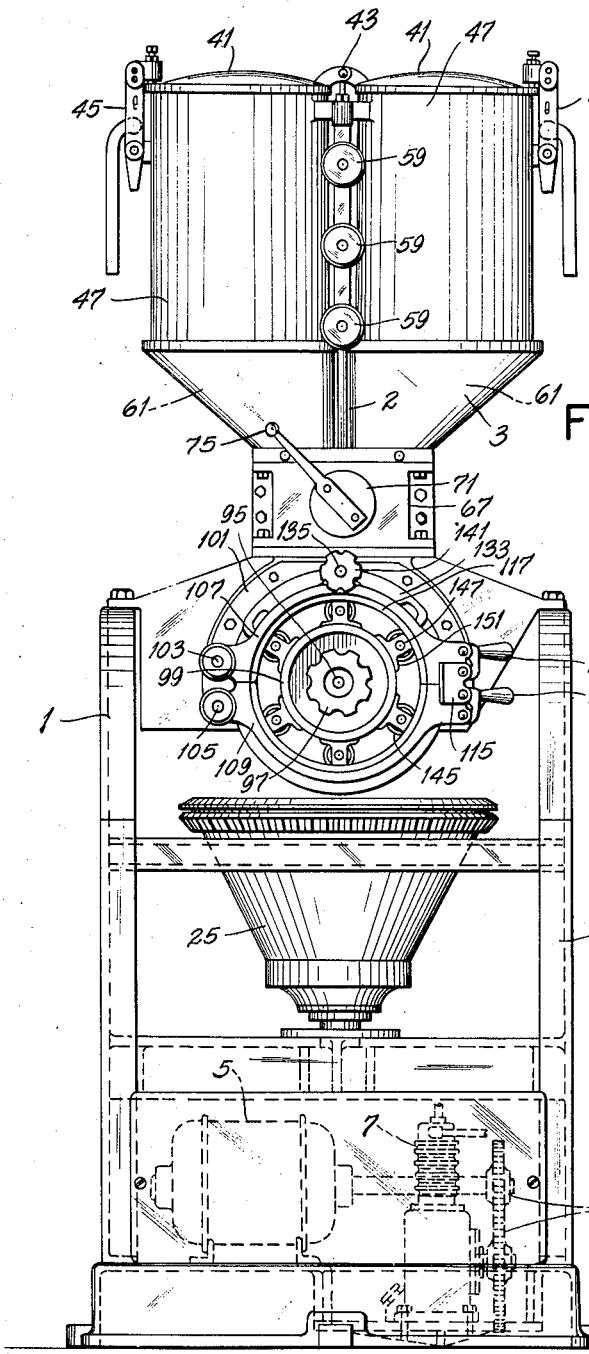
Figure 2:
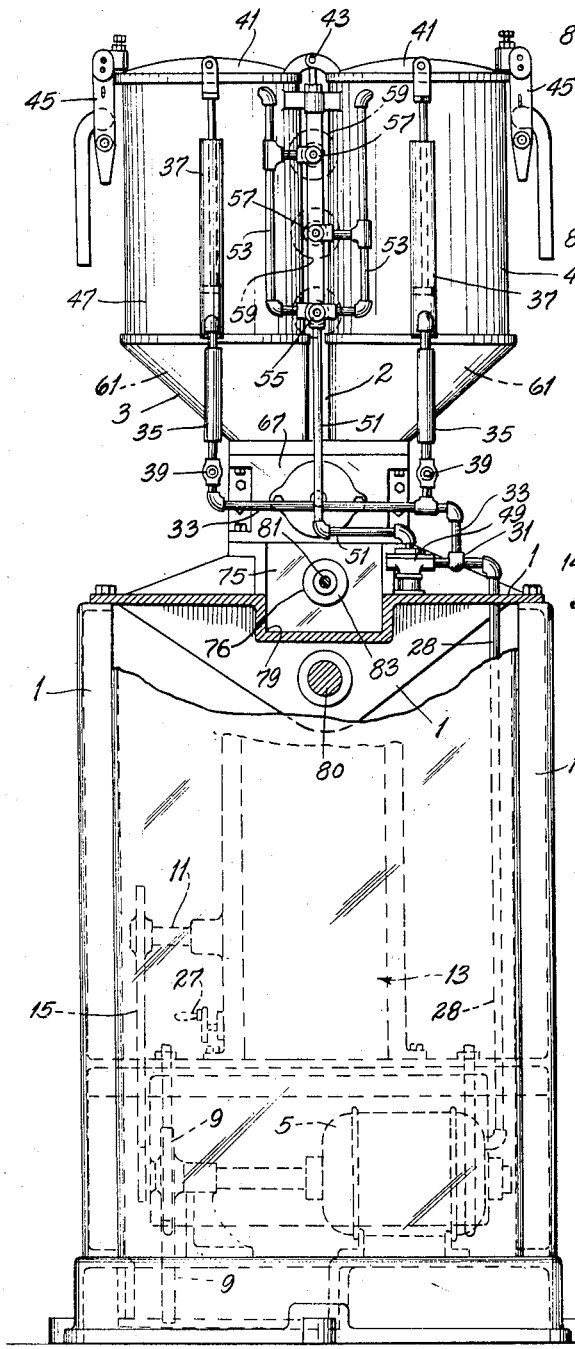
Fig. 2 is a back elevation of the machine of Fig. 1, certain parts being broken away for clarity.
Figure 3:
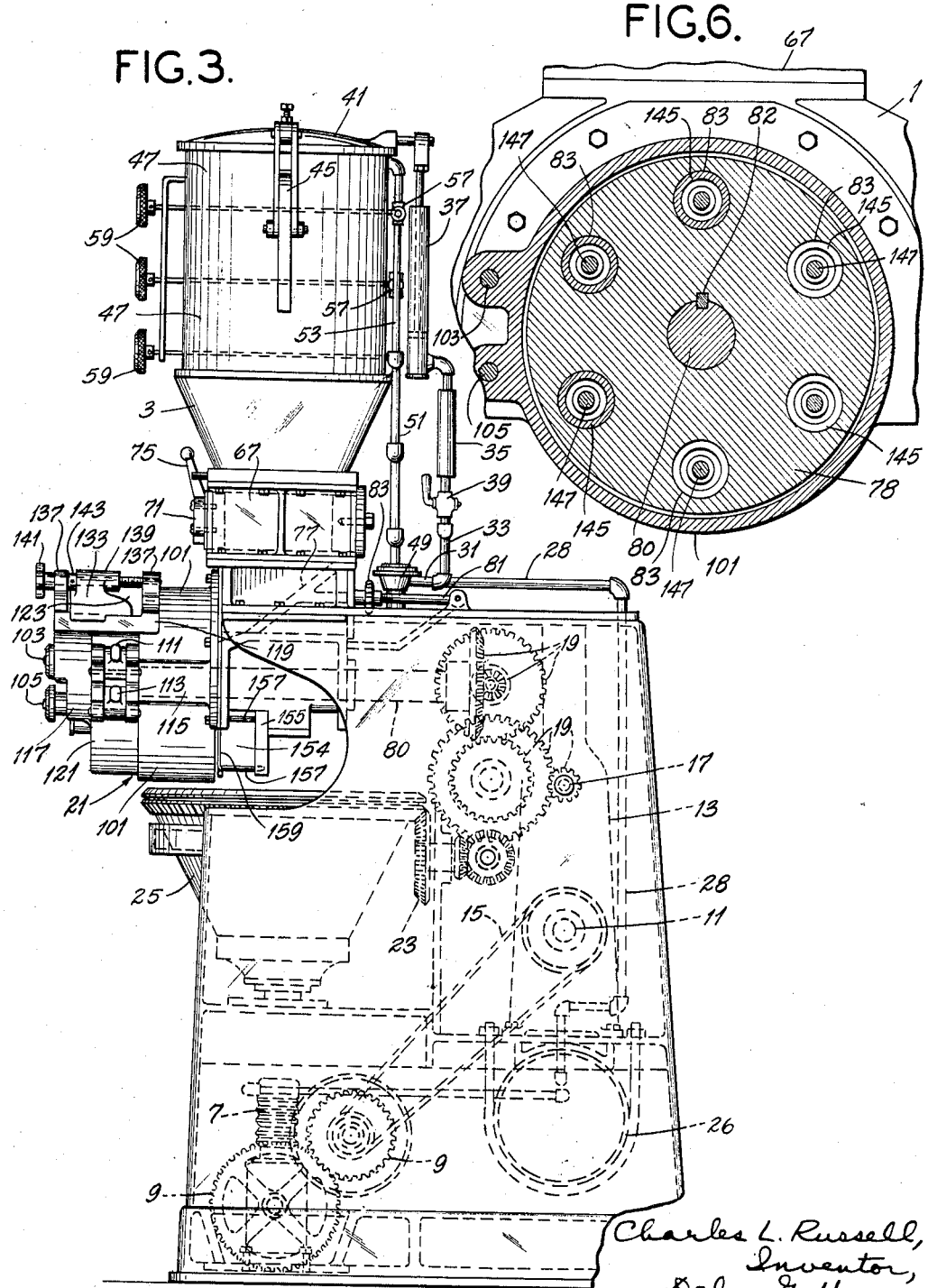
Fig. 3 is a side elevation taken from the right of Fig. 1.

Referring now more particularly to Fig. 1, there is shown at numeral 1 a frame supporting a supply hopper 3. The frame 1 also houses a driving motor 5 which drives an air compressor 7 by way of a set of gears 9. The motor 5 also drives (see Figures 2 and 3) the constant speed shaft 11 of a variable-speed transmission 13, this being done by way of a chain drive 15. The variable speed transmission may be any one of the types now on the market, but I prefer for the present embodiment of the invention, a so-called "Reeves" drive such as is illustrated and described in Kinematics of Machines, by Guillet, second edition, 1930, pages 201–202. From the variable speed shaft 17 (Fig. 3) of the variable drive or transmission 13 there is provided a train of gears 19 for transmitting motion to a scaling valve 21. A branch portion 23 of said train leads to and drives a rounding bowl 25. The speed of shaft 17 with respect to shaft 11 of the transmission 13 may be adjusted from a hand wheel 27 (Fig. 2).

The air compressor 7 supplies air to a supply tank 26 (Fig. 3), the compressor and tank arrangement being equipped with suitable unloading and safety devices. An air line 28 leads from the tank 26 up to a branch 31. One lead 33 from said branch 31 connects to two pipe sections 35 connected to the cylinders of two lifting devices 37, the air in pipes 35 being controllable by stop cocks 39. It should be understood at this point in the description, that the hopper 3 is separated into compartments connected with tanks 47, each being covered by a lid 41. The lids are hinged to a common center hinge member 43 and are normally clamped down by means of hand-operated clamps 45. When it is desired to lift a lid, the respective clamp 45 is loosened and the respective stop cock 39 opened, whereupon air flows through the line 35 and beneath suitable pistons to lift the lid. It will be seen that the lids may be lifted alternatively or simultaneously, inasmuch as the cocks 39 are independently operable. It will be noted that the chamber 3 which is centrally partitioned into two divisions, as shown at numeral 2, has each of said divisions communicate with said separate tanks 47 to which the lids 41 apply.

The other division of the branch 33 of the line 29 (Fig. 2) passes through a regulator 49 and thence to a line 51 which branches into two lines 53 leading into the tops of the interiors of the dough tanks 47. A three-way cock 55 in the line permits of placing either or both of the tanks 47 under pressure, and release cocks 57 permit of relief of the pressure in either of the tanks desired. Hand wheels 59 (Fig. 1) with suitable extension rods are used for control purposes of the valves or cocks 55 and 57. Suitable safety or pop valves are included in the lines referred to.

Figure 4:
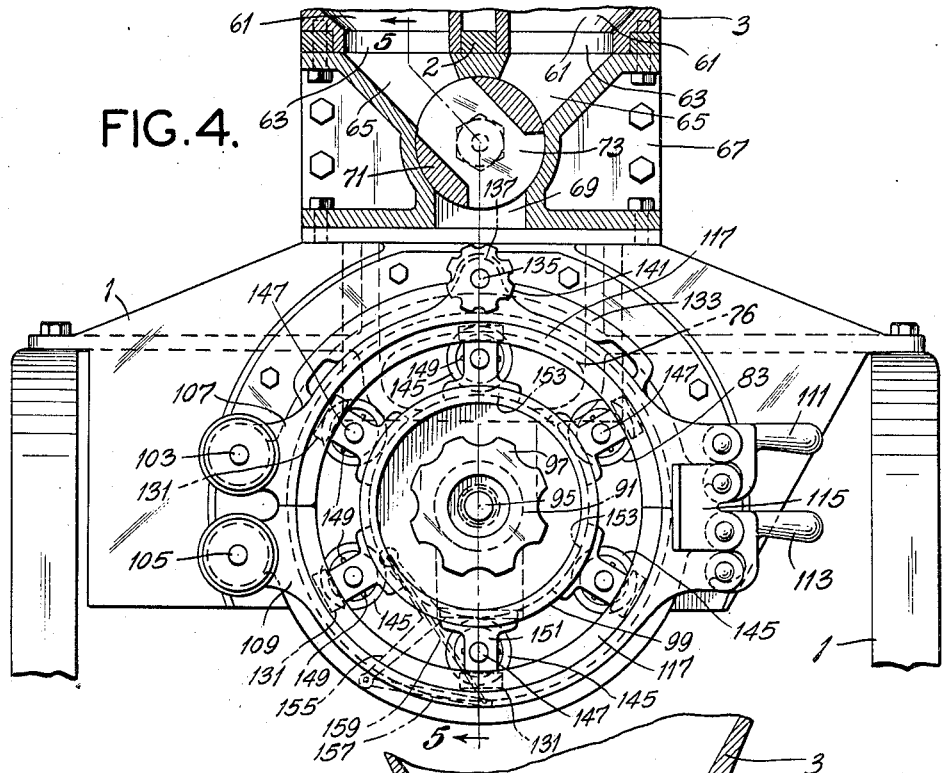
Fig. 4 is a front elevation of a scaling mechanism, certain parts being shown in cross section.

As shown in Fig. 4, the separate tanks 47 lead to separate chambers 61 in the members 3. The separate chambers 61 have separate outlets 63 which are clamped in juxtaposition to separate converging inlets 65 in a valve block 67. The valve block 67 has a downwardly extending outlet 69, and a cylindrical valve closure element 71 which is provided with an interior passage 73. A handle 74 (see Fig. 1) permits manual rotation of the valve closure element 71, so that the passage 73 may be used alternately to connect either inlet 65 to the outlet 69, thus placing, at any one time, only one of the tanks 47 in communication with the outlet 69.

The outlet 69 delivers the dough into a chamber 75 (see Fig. 5), which is provided with a removable sloping bottom member 77, and a front having a discharge opening 76. The member 77 is received in a suitable recess 79 on the top of the frame 1, and is held in operative position by a swingable arm 81 having an adjustable head 83. By reference to Fig. 5, it will readily be seen that the member 77 may be removed from the apparatus, as for cleaning, by lifting the arm 81 to its dotted line position, and then merely sliding the member 77 backwardly and lifting it away from the frame.

The sloping bottom of member 77 in the chamber 75 serves to change the direction of flow of the incoming dough, which, up to the present point, has been vertically downward, to a horizontal, forward direction, through discharge opening 76 and into the scaling valve or mechanism 21, which will now be described.

Numeral 78 indicates a circular disc or plate of considerable thickness, that is mounted on a shaft 80, and secured against rotation thereon by means of a spline 82. The shaft 80 (see Fig. 3) is driven by the gear train 19 heretofore described.

Numerals 83 indicate a plurality (six in the present embodiment) of holes or cylinders that are provided in a circular arrangement on the disc 78, the axes of the cylinders 83 being parallel to the axis of the shaft 80. The cylinders 83 extend through the disc 78, from the front face to the back face thereof.

The frame 1 is provided with a flat front face 85 against which the back face of the disc 78 fits tightly. The edges of the chamber 75 form a continuation of this front face 85.

Numeral 87 indicates a portion or extension of the shaft 80 of reduced diameter, on which slips a collar or disc 89. Numeral 91 indicates a second collar, and numeral 93 indicates a compression spring that reacts between the outer face of collar 89 and the inner face of collar 91. The extreme end of the shaft 80 is threaded, as indicated at numeral 95, to receive a knurled nut 97. The nut 97, bearing upon the collar 91, places compression in the spring 93, which reacts against the collar 89 to force the disc against the face 85 of the frame 1.

The disc 89 is formed with a forwardly extending cylindrical portion 99, which encloses the outer end of the shaft 80 and the mechanism mounted thereon, as described. The outer cylindrical surface of the extension 99 forms a guide means for certain elements to be described.

Numeral 101 indicates a cylindrical member that is rigidly mounted on the frame 1 surrounding the outer periphery of rotatable disc 78. The cylinder 101 is not rotatable. The cylinder 101 serves to mount, in a stationary manner, a dough dividing regulating mechanism next to be described.

Extending forwardly from one side of the cylinder 101 are a pair of pins 103 and 105, upon which are rotatably hinged upper and lower semicircular halves 107 and 109 of a clamp arrangement. The opposite ends of the clamp halves 107 and 109 come together, and are latched by hooking mechanisms 111 and 113, respectively, to a suitable member 115 extending outwardly from the opposite side of the cylinder 101. The construction of the hooking members 111 and 113, which are of a standard type, is adequately illustrated in Fig. 4. When the halves 107 and 109 are brought together, it will be seen, they form a complete circle that is coaxial with the shaft 80.

When the hooks 111 and 113 are released, the clamp halves 107 and 109 may be swung outwardly on their respective pins 103 and 105, to the positions indicated in Fig. 7, for purposes hereinafter to be described.

Each of the clamp halves 107 and 109 comprises a front ring portion 117 and rear ring portion 119, which are connected by more-or-less cylindrical portion 121. In the upper clamp half 107, the cylindrical portion 121 is omitted for a considerable interval 123, and thus does not appear in the cross section of Fig. 5. The inner faces of cylindrical portions 121 on the two clamp halves 107 and 109 serve to mount a cam raceway or track 125, which is shown in developed form in Figures 9 and 10.

Referring now to Fig. 9, it will be seen that the raceway 125 comprises a forward cam track 127 and a rearward cam track 129. On the upper clamp half 107, the raceway 125 is divided into three sections A, B and C, while on the lower clamp half 109, the raceway is divided into three sections D, E and F. In the sections A, B, C, E and F, the rearward cam 129 is disposed parallel to the end pieces 119, and at a minimum distance from said end pieces 119. In the sections A and F, the forward cam 127 is parallel to the rearward cam 129, and spaced therefrom a uniform distance sufficient closely to receive a roller 131, the purpose of which will be explained hereinafter. In the sections B and D, the forward cam 127 is spaced parallel to the rearward cam 129, but is at a minimum distance from the front pieces 117, thus providing, in these sections, a relatively wide space between the cams 127 and 129. In section E, the forward cam 127 is curved, in such a manner as to join the portions of cam 127 located in sections D and F in a smooth, unbroken manner.

It will be understood that when the clamp halves 107 and 109 are closed together, as indicated in Fig. 4, the outer extremities of sections A and F juxtapose, the cam 127 and 129 being continued, without lateral shifting, across the joint.

In all of the sections A, C, D, E and F, the cams 127 and 129 are permanently mounted, in a fixed manner, on the cylindrical pieces 121, and are not movable with respect thereto. The sections of cams 127 and 129 on section B, on the other hand, are mounted on a movable block 133. The block 133 has a cylindrical shape to form an approximate continuation of the cylindrical walls 121, but is suspended on a horizontal screw 135 which is journaled in extensions 137 projecting from the upper edges of side pieces 117 and 119. The screw 135 passes through a lead block 139 which forms a top portion of the movable block 133. A handle 141 is provided for rotating the screw 135. A collar 143 on the screw 135 prevents moving the block 133 too far forward, or to the left, in the Fig. 5 position. It will readily be seen that when the handle 141 is actuated to turn the screw 135, the lead block 139 slides on said screw 135 in such manner as to move the block 133 back and forth between the side pieces 117 and 119.

In Fig. 9, the block 133 is shown in its extreme forward, or left-hand position. In this position it will be seen that cam 127 on block 133 coincides with cam 127 on section C, while the cam 129 on block 133 is of a curved form, commencing (at the top in Fig. 9) as an extension of cam 129 in section A. The curvature of cam 129 on block 133 is such that at the lower end of block 133 (in Fig. 9) the cams 127 and 129 are spaced apart only by a distance sufficient to clear the roller 131.

Fig. 10 shows, by way of distinction, how the movable block 133 appears when it is in its most rearward, or right-hand position. In Fig. 10 it will be seen that neither cam 127 nor cam 129, on the block 133, coincide with, or form extensions of, the respective ends of cams 127 and 129 on sections A and C.

The significance of the movement of the block 133 will be explained hereinafter.

Returning now to Fig. 5, it will be seen that each measuring cylinder 83 is provided with a relatively tightly fitting, albeit movable piston 145. The piston 145 is of a cup shape, with its closed end to the right. Extending to the left from the piston 145 is a connecting rod 147, the outer end of which is secured by a pin 149 to a slidable bearing block 151. By reference to Fig. 4, it will be seen that the inner surface 153 of each bearing block 151 is curved, in order to fit against the outer surface of cylinder 99 hereinbefore described. The radially outer ends of the bearing blocks 151 serve to rotatably mount the rollers 131, hereinbefore described.

Figure 5:
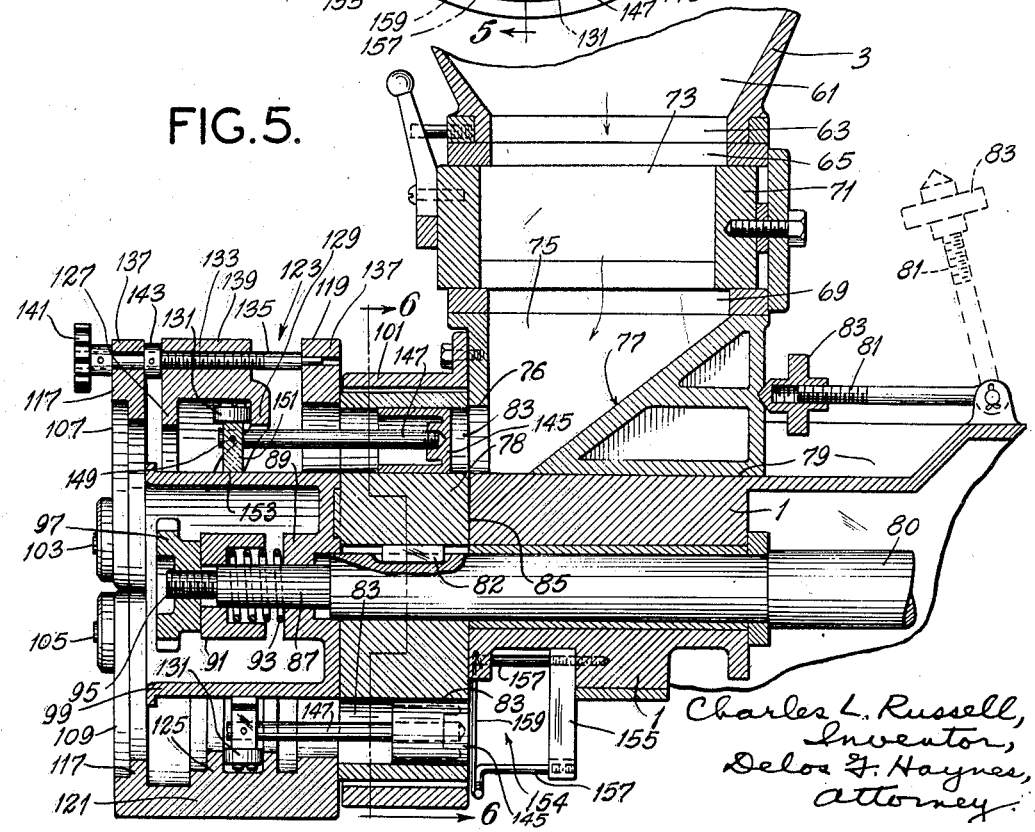
Fig. 5 is a vertical cross section taken substantially along line 5—5 of Fig. 4.

By reference to Fig. 5, it will be seen that the surface 85 of frame 1, which is in juxtaposition with the rotatable disc 78, is not continued around the entire circle, but is purposely discontinued at the bottom in order to provide a discharge space or opening indicated by numeral 154. Mounted on the frame 1 in the region of the discharge opening 154 is a bracket 155, on which are mounted pins 157. The ends of pins 157 support a wire or other knock-off roller, scraper or paddle or the like 159 (see also Fig. 4) which closely juxtaposes the surface of the disc 78 in its outlet position, for purposes hereinafter to be described.

The discharge opening 154 is, in the finished machine, preferably positioned directly above the receiving hopper of the rounder 25.

The operation of the device is as follows:

The motor 5 operates continuously and hence continuously drives the compressor 7 which maintains the tank 26 at the predetermined pressure, as determined by the safety device or unloader. The constant speed shaft 11 of the speed reducer 13 operates continuously. By manipulating the hand wheel 27, the variable speed drive 13 is caused to operate its shaft 17 at any one of a predetermined range of rates, thus providing for variation in the rate of operation of the divider 21 and the rounder 25.

The variable speed shaft 17 thus drives the divider 21 by way of the train of gears 19 (which preferably includes a suitable clutch) and also drives the rounder 25 by way of the branch train 23. From the above it will be seen that the output of the machine is regulated by means of the variable speed drive and that the divider 21 may be stopped at any time without stopping the remainder of the machine.

Dough is placed in one or both of the tanks 47. It is preferably placed in only one tank and from there is fed by means of air pressure to the chamber 65 associated with the tank 47 being used. The valve 71 is turned to connect that chamber 65 to the outlet chamber 69, and thus to the chamber 75. The chamber 75 delivers dough to the scaling valve 21, the operation of which will now be described.

The disc 78, and all parts connected therewith, are rotating. This means that each of the open-mouthed cylinders 83 will successively be brought into position before the chamber 75, in order to receive dough. The placement of the pistons 145 in the cylinders 83 is regulated by the cams 127 and 129, through their action on the rollers 131 associated with the pistons 145. The sequence of position of the pistons 145 will be understood by reference to Figures 8 and 9. The disc 78, it will be understood, is rotating in a counter-clockwise direction. Starting with the right-hand edge of upper clamp half 107 as an initial position, it will be seen that a given roller 131 will be in section A, which means that this roller 131 is in its extreme right-hand position. The length of the connecting rod 147 is such that the extreme right-hand position of the roller 131 brings the face of piston 145 flush with the face of disc 78; no portion of the cylinder 83 is therefore open at this time. However, as the given roller 131 passes from section A into section B, it encounters the curved portion of cam 129, which moves the roller more and more to the left as the roller traverses section B. Section B, which extends through about 85° of arc, is the loading section of the operation of the scaling valve. During motion through this section, the piston 145 is slowly retracted in the cylinder 83, allowing an increasingly greater depth of the cylinder 83 to be exposed to the incoming mass of dough under pressure in the chamber 75. The pressure of the dough in the chamber 75 causes it to enter and fill the cylinder 83, to an extent determined by the position of piston 145. As illustrated in Fig. 9, the movable section 133 of the camming device is arranged to scale a maximum quantity of dough; in other words, the piston 145, during its traverse of section B, is moved from its extreme right-hand position to its extreme left-hand position.

During this loading stage, the retraction of the piston 145 is normally accomplished by the engagement of roller 131 with cam 129. However, if the pressure of the dough is sufficient, it may force against the piston 145 causing the roller 131 to leave the cam 129. The forward cam 127, however, stops the movement of roller 131 as soon as the piston 145 has reached its extreme left-hand position, thus scaling the proper amount of dough. By the time the roller 131 is ready to enter section C, it is again brought into accurate position between cams 127 and 129, because of the convergence of the cams, regardless of whether or not it has been actuated entirely by the cam 129, or partly by the pressure of the dough, in traversing section B.

Because the cylinder 83 enters the loading phase, namely, its region of juxtaposition with the chamber 75 with the piston 145 in its extreme right-hand position, there is no opportunity for any air to accumulate in the cylinder 83, and thus the dough entering the cylinder 83, as the piston 145 retracts, is not obliged to displace any air. In other words, the scaling valve of the present invention acts in a positive displacement manner, and errors in measurement due to entrapped volumes of air are not encountered.

Returning to the action of the cam race 125 on the roller 131, it will be seen that as the roller 131 leaves section B, it is definitely positioned by both the cams 127 and cam 129, so that the cylinder 83 has a definite measured charge of dough therein. The edges of disc 78 and chamber 75 act as shearing means, detaching the mass of dough in cylinder 83 from the mass of dough in the chamber 75, at about this time.

While the roller 131 is in sections C and D of the cam race, it is prevented from moving to the left by cam 127, but its movement to the right is prevented only by the presence of the mass of dough in the cylinder 83. Sections C and D together, which extend through about 60° of arc, are denominated as the loaded section of the traverse of the disc 78.

Entering section E, the roller 131 is forced to the right by the curved portion of cam 127. This rightward movement of the roller 131 causes the piston 145 to move to the right, and since the disc 78 is now in the region of the discharge opening 154, the mass of dough in cylinder 83 is forced forwardly and ejected from the cylinder 83. The wire or other knock-out member 159 serves finally to scrape the surface of piston 145, making sure that all of the dough as thus measured is detached or removed from the scaling valve. The final ejection of the mass of dough takes place as the roller 131 passes from section E to section F, at which point it is again confined as to position between cams 127 and 129.

This emptying phase of operation, comprising section E, extends through about 45° of arc.

The roller 131, throughout section F and into section A, maintains the surface of piston 145 at its extreme right-hand position in cylinder 83, as heretofore described, and conditions the cylinder 83 for measuring another mass of dough.

With the sliding block 133 in its extreme left-hand position, as shown in Fig. 9, the scaling valve 21 measures a maximum quantity of dough in each of the cylinders 83. By rotating the handle 141 in such a manner as to move the sliding block 133 to the right, the cam 127 is moved more and more to the right, until the extreme right-hand position shown in Fig. 10 is achieved. With the block in this position, the traverse of the roller 131 through section D, it will readily be seen, is such as to confine the leftward movement of the roller 131 to a lesser movement than was the case in Fig. 9. This means that less of the cylinder 83 will be filled with dough, or, in other words, the valve will scale a smaller mass of dough. The remainder of the traverse of roller 131 through sections C, D and E is the same as heretofore described in connection with Fig. 9, except that it is to be noted that with a smaller measured quantity of dough the roller 131 passes across sections C and D, and the fore-part of section E, without being in contact with either cam 127 or cam 129. This is of no consequence, however, as the cam means are provided for limiting the measuring movement of the piston 145 as well as the ejecting movement of piston 145.

Quantities of dough of intermediate weight are scaled by adjusting the position of the sliding cam block 133 between its Fig. 9 and its Fig. 10 positions.

From the discharge opening 154, the scaled mass of dough drops into the rounder 25, where it is rounded up and delivered in a manner well-known in the art.

The positive indrawing action of the cam with respect to the piston 145, coordinating with the dough movement as it is displaced under pressure, results in substantially no "punishing" of the dough as it enters the scaling cylinders.

When the cylinder 47 which has been previously loaded with dough becomes empty or nearly empty, the other cylinder 47 is filled, closed, and air pressure applied. The pressure is then removed from the substantially empty tank 47, and the valve 71 manually changed by moving the handle 74 in order to connect the now full tank. Thus continuous action of the machine is possible without shutdowns for reloading.

A valuable advantage of the dough divider of the present invention is the manner in which it may be disassembled for cleaning. For example, in order to clean the scaling valve 21, all that needs to be done is to open the clamp halves 107 and 109 to the position shown in Fig. 7, loosen the nut 97, and remove the entire rotatable assembly from the shaft 80. The chamber 75 may also be cleaned, merely by moving the swinging arm 81 to its dotted line position, as shown in Fig. 5, and then merely slipping the member 77 to the right and lifting it from the frame 1. The valve 71 may also be removed from the apparatus with facility. The tanks 47 may readily be cleaned without removing them from the machine.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A dough divider having a chamber, means for delivering dough under pressure to said chamber, a disc rotatable in juxtaposition with respect to said chamber, said disc having a plurality of cylinders therein disposed in a circle around the center of rotation of said disc, the axes of said cylinders being parallel to the axis of rotation of said disc, pistons in said cylinders, means for positively moving said pistons in said cylinders as they pass said chamber so as to effect an entry of a predetermined mass of dough into the respective cylinders, said means comprising rollers connected for movement with said pistons, and rotatable about an axis radial to the axis of rotation of said disc, and camming tracks disposed around the axis of rotation of said disc in position to be engaged by said rollers, and means supporting the said camming tracks, comprising a pair of semi-circular clamps arranged to be brought together in cylindrical juxtaposition, said camming tracks being located on the inside surfaces of said clamps.

2. A dough divider having a chamber, means for delivering dough under pressure to said chamber, a disc rotatable in juxtaposition with respect to said chamber, said disc having a plurality of cylinders therein disposed in a circle around the center of rotation of said disc, the axes of said cylinders being parallel to the axis of rotation of said disc, pistons in said cylinders, means for positively moving said pistons in said cylinders as they pass said chamber so as to effect an entry of a predetermined mass of dough into the respective cylinders, said means comprising rollers connected for movement with said piston, and rotatable about an axis radial to the axis of rotation of said disc, and camming tracks disposed around the axis of rotation of said disc in position to be engaged by said rollers, and means supporting the said camming tracks, comprising a pair of semi-circular clamps arranged to be brought together in cylindrical juxtaposition, said camming tracks being located on the inside surfaces of said clamps, said camming tracks having at least one adjustable section, whereby the amount of dough received into said cylinders may be regulated.

CHARLES L. RUSSELL.